Figure 1:
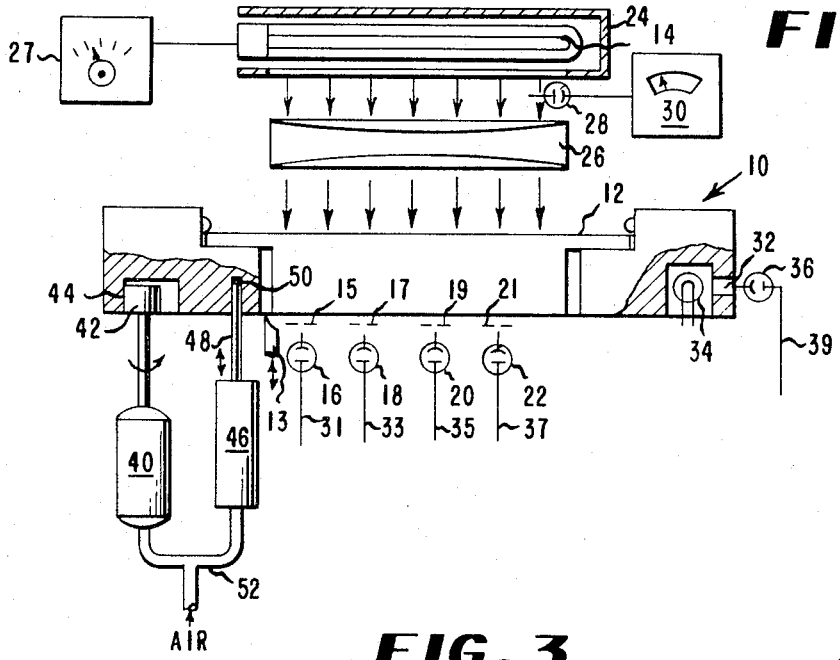
Figure 3:
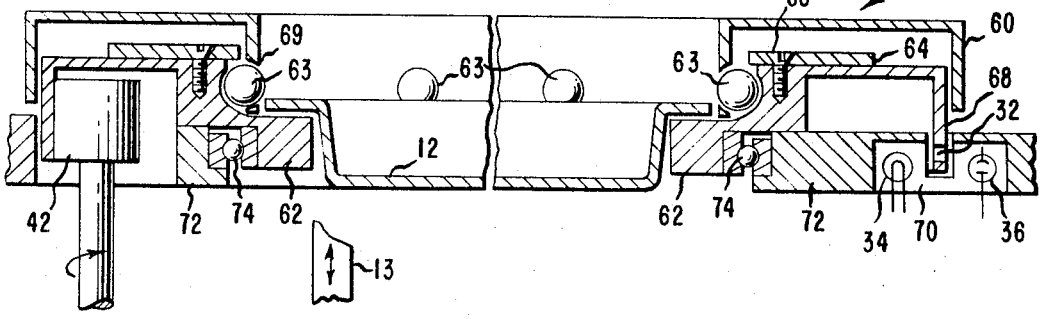
Figure 4:
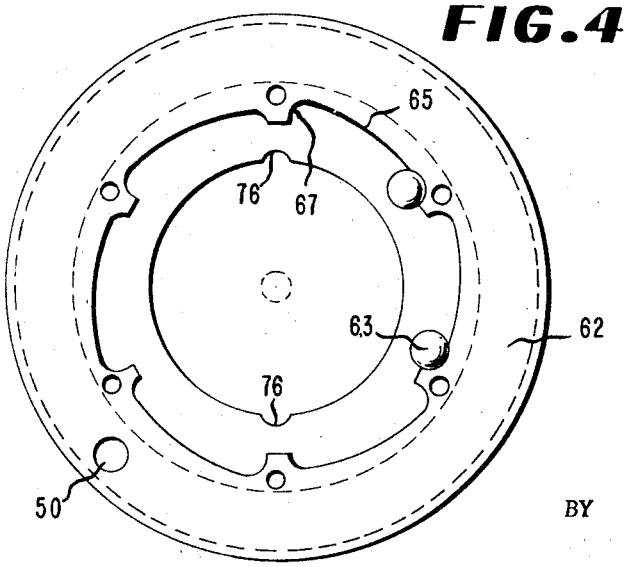
Figure 2:
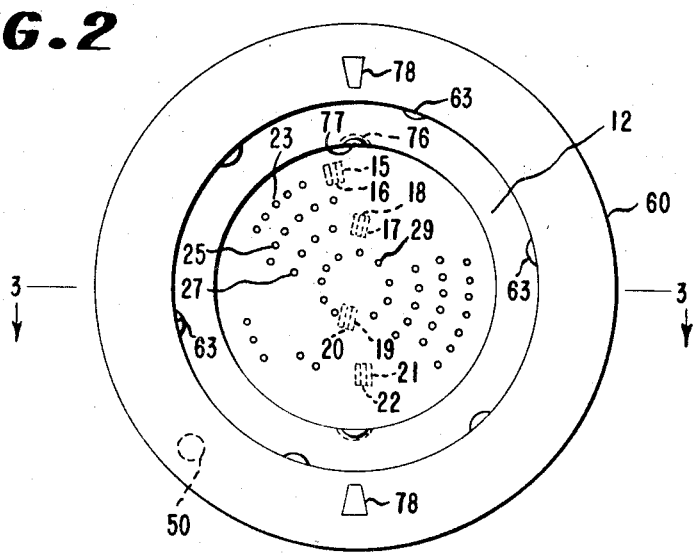
Figure 5:
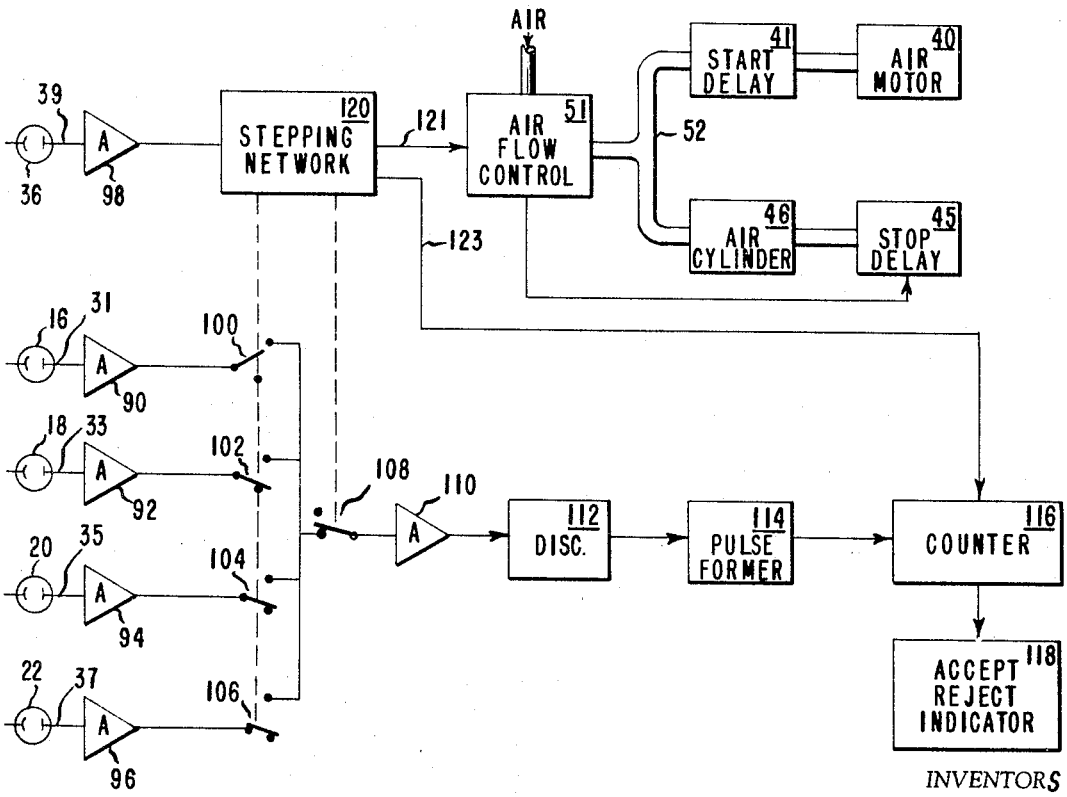

T862010

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 6, 1969

862 O.G. 23

773,441

SPINNERET CAPILLARY INSPECTION APPARATUS

Ronald George Heitz and George Hilliary Hutchens, Waynesboro, Va., assignors to E. I. du Pont de Nemours and Company, Wilmington, Del., a corporation of Delaware

Filed Nov. 5, 1968. Published May 6, 1969

Int. Cl. G01n *21/30*

U.S. Cl. 250—219

2 Sheets Drawing. 10 Pages Specification

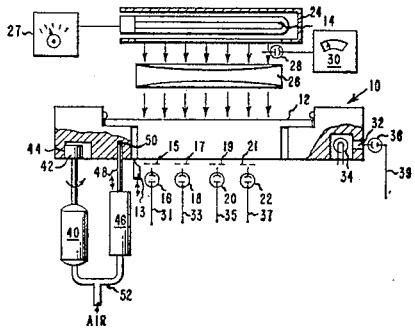

An apparatus for inspecting concentrically arranged rows of holes in a spinneret that includes a rotatable driven support for the spinneret, a light source for directing light through the holes and a plurality of photocells responsive to light passing through the holes. Each photocell is aligned to selectively receive light from each hole of one of the rows of holes and emits an electrical signal proportional to the light received from each hole. The electrical signals are counted by a circuit that is automatically connected in sequence to each photocell for one revolution of the support. The count received from the photocells is compared to the number of holes in the spinneret to determine acceptability for use.

May 6, 1969 R. G. HEITZ ET AL DEF. PUB. T862010

SPINNERET CAPILLARY INSPECTION APPARATUS SN - 773441

Filed Nov. 5, 1968 Sheet 1 of 2

INVENTORS
RONALD GEORGE HEITZ
GEORGE HILLIARY HUTCHENS

BY Howard R West Jr
ATTORNEY

INVENTORS
RONALD GEORGE HEITZ
GEORGE HILLIARY HUTCHENS

BY Howard P. West Jr.
ATTORNEY